United States Patent
Sturgeon et al.

(10) Patent No.: US 6,219,041 B1
(45) Date of Patent: *Apr. 17, 2001

(54) UNIVERSAL USER INTERFACE FOR A SYSTEM UTILIZING MULTIPLE PROCESSES

(75) Inventors: Derrill L. Sturgeon, Houston; Mark P. Vaughan, Spring; Christopher A. Howard, Houston, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,322

(22) Filed: Sep. 30, 1997

(51) Int. Cl.[7] .................................................. G06F 13/00
(52) U.S. Cl. ........................................... 345/327; 348/552
(58) Field of Search ................................... 345/327, 328; 348/906, 61, 552, 563

(56) References Cited

U.S. PATENT DOCUMENTS

| | | | | |
|---|---|---|---|---|
| 5,420,647 | * | 5/1995 | Levine | 348/734 |
| 5,432,561 | * | 7/1995 | Strubbe | 348/565 |
| 5,539,451 | * | 7/1996 | Carey et al. | 348/12 |
| 5,655,214 | * | 8/1997 | Mullett | 455/5.1 |
| 5,675,390 | * | 10/1997 | Schindler et al. | 348/552 |
| 5,787,259 | * | 7/1998 | Haroun et al. | 395/200.83 |
| 5,905,497 | * | 5/1999 | Vaughan et al. | 345/352 |
| 5,926,207 | * | 7/1999 | Vaughan et al. | 348/13 |

OTHER PUBLICATIONS

Nilsson, Frank; "DVD—the storage medium for the future?"; Accessed Sep. 8, 1997; pp. 1–9.

DVD Frequently Asked Questions (with answers!); Accessed Jun. 18, 1997; http://www.videodiscovery.com/vdyweb/dvd/vdfaq.html.

Parker, Dana J.; "DVD: The Update"; *CD–ROM Professional*, Aug., 1996; Accessed Sep. 8, 1997; pp. 1–10.

"Digital Video Disc: The Coming Revolution in Consumer Electronics"; *C–Cube Microsystems*; Accessed Jun. 23, 1997; http://www.c-cube.com/technology/dvd.html.

"Toshiba SD3006 DVD Digital Video Disc Player"; Consumer Direct Warehouse; Accessed Jun. 18, 1997; http://www.consumer-direct.com/detail.com/detail.cfm?V-PARTNO=SD3006&WEIGHT=9.0&Q=230.0.

* cited by examiner

*Primary Examiner*—Ba Huynh
(74) *Attorney, Agent, or Firm*—Sharp, Comfort & Merrett, P.C.

(57) ABSTRACT

A computer convergence device, operable in a at least two modes, such as a computer mode and a video mode and when in the video mode the computer convergence device is operable in at least two states. The computer convergence device includes a universal graphic user interface for providing information corresponding to the operating states. The universal graphic user interface receives inputs from a user which can be used to control various characteristics of each operating state, and can be used to change the operating state of the computer convergence device. The computer convergence device further includes a controller for interfacing between the universal graphic user interface and the processes of the operating states.

13 Claims, 1 Drawing Sheet

UNIVERSAL USER INTERFACE FOR A SYSTEM UTILIZING MULTIPLE PROCESSES

BACKGROUND OF THE INVENTION

1. Field of the Invention

The present invention relates to computer convergence devices, and more particularly, but not by way of limitation, to a universal graphics user interface for managing a users interface with multiple processes such that the user interaction is controlled from a single point.

2. Description of Related Art

A computer convergence device is a fully functional computer integrated or converged with another consumer electronic device. One such convergence device is a personal computer/television (PC/TV) convergence device, which integrates a personal computer with television functionality, providing television viewing (via broadcast, cable, Digital Satellite, video cassette recorder (VCR), electronic game device, or other video source) and personal computing functionality. The convergence of a personal computer and television functionality, among other things, permits combined access to television viewing and program information, computer related functionality, and Internet access.

A PC/TV convergence device may comprise a fully function computer including fax/modems, DVD/CD-ROM players, and media storage such as hard drives and floppy drives. The convergence with television functionality includes utilizing multiple video inputs to receive a variety of video signals such as from cable systems, DVDs, VCRs, and electronic game machines. The computer is interfaced with a display monitor, often a big screen monitor, with either the interlaced video signal being converted to a scan video graphics adapter (VGA) signal or the computer's scan VGA signal being converted to an National Television Standards Committee (NTSC) interfaced signal. Because the PC/TV convergence device is controlled by the computer's operating system, the PC/TV convergence device can, among other things, simultaneously display PC applications and TV programs on a single monitor. The convergence of personal computer and television functionalities into a single device also permits the utilization of the communications bandwidth, mass storage and graphics of the computer to deliver, store and display small computer applications during a traditional television viewing environment.

As the functionality of computer systems continues to increase so does the spectrum of computer consumers and users. As can be appreciated, there is great demand by many of the consumers to make computer systems as user friendly as possible, i.e., as easy and intuitive to use as possible. One of the problems encountered with an integrated computer system, such as a PC/TV convergence devices, is that it is often necessary for multiple processes to handle user interaction, although each of the processes do not own the user interface component to which messages will be sent. Because each process that requires user interaction will present it's own user interface component, it is not very user friendly to the user.

Accordingly, based upon the foregoing, it should be appreciated that there is a need for a computer convergence system with a user friendly user interface that can control user interaction from a single point.

SUMMARY OF THE INVENTION

The present invention overcomes the above identified problems as well as other shortcomings and deficiencies of existing technologies by providing a computer convergence device utilizing a controller that manages communication between a universal graphics user interface and the user interfaces of multiple processes.

The present invention further provides a computer convergence device, operable in a at least two modes, such as a computer mode and a video mode and when in the video mode the computer convergence device is operable in at least two states. The computer convergence device, when operating in the video mode, includes a universal graphic user interface for providing information corresponding to the various operating states. The universal graphic user interface receives inputs from a user which can be used to control various characteristics of each operating state, and can be used to change the operating state of the computer convergence device. The computer convergence device further includes a controller for managing communication between the universal graphic user interface and the processes of the operating states such that user interaction can be controlled from a single point and that processes can be free of the added complexity of creating and managing user interface components.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
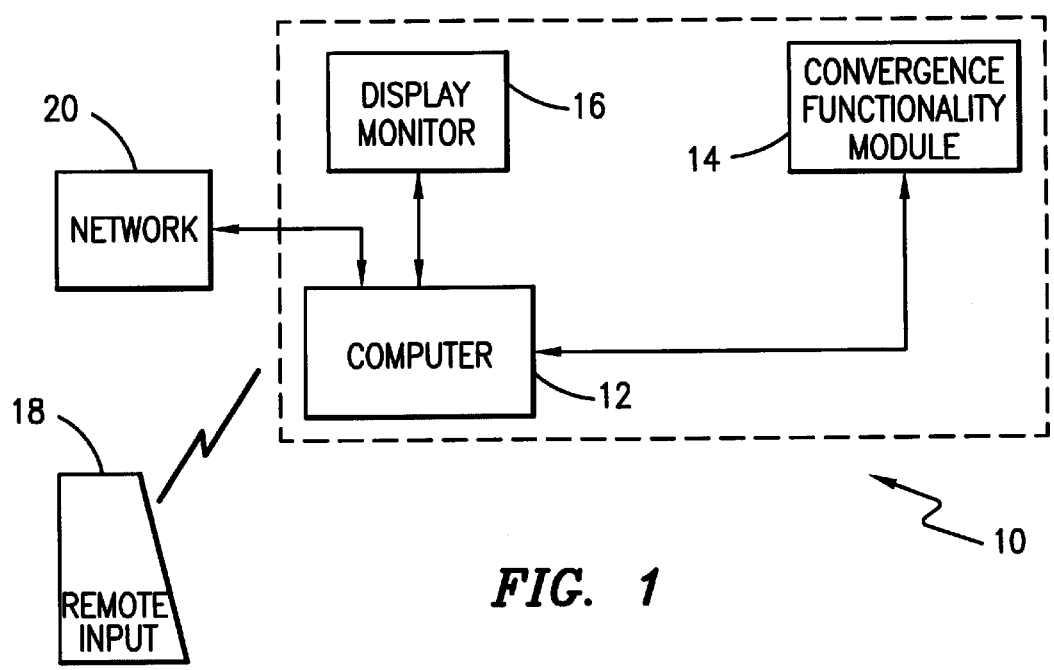
FIG. 1 is a block diagram illustrating a computer convergence system in accordance with the principles of the present invention.

With reference now to the figures wherein like or similar elements are designated with identical reference numerals, there are depicted block diagrams illustrating the present invention. The purpose of these block diagrams is to illustrate the features of the invention and the basic principles of operation of an embodiment thereof. These block diagrams are not necessarily intended to schematically represent particular modules of circuitry or any particular data or control paths.

Referring now to FIG. 1, there is shown a block diagram illustrating a computer convergence system 10. Computer convergence system 10 includes a computer 12, a convergence functionality module 14, a display monitor 16 and a remote input 18.

Computer 12 may preferably be a personal computer, and although not shown, includes a processor, memory, data retrieval and storage media and communication data ports. Display monitor 16 is operable to receive and display video signals received from computer 12 and may include an audio output system for playing audio signals received from computer 12.

Computer 12 is coupled to convergence functionality module 14 that is operable to receive or generate data signals, such as video, audio, and graphic information. For example convergence functionality module 14 may comprise a receiver, decoder or tuner capable of receiving video signals in the form of the National Television Standards Committee (NTSC) or Phase Alternate Line (PAL) forms, from any medium such as from a cable system or from a digital satellite system. Convergence functionality module 14 may also include or consist of various other types of consumer electronic units. For example, convergence functionality module 14 could also include or consist of video gaming units and other direct audio/video sources such as video cassette recorders (VCRs), and video disk player/recorders, including digital versatile disk (DVD) player/recorders.

Computer convergence system 10 may preferably be operated by a user using wireless remote input 18 operating, for example, via radio waves, infrared waves or acoustic waves. Although good results have been achieved using wireless keyboards and remote controls for remote input 18, it is contemplated that any input device, wireless or hardwired, could be used to operate computer convergence system 10.

Still referring to FIG. 1, computer convergence system 10 is configurable to be connected and communicate with a network 20. It is contemplated that network 20 could be any type of network, including a Local Area Network, a Wide Area Network and the Internet.

In general operation, computer convergence system 10 can be operated in various modes. For example, computer convergence system 10 can be operated in a personal computer mode and a television mode. When in television mode, personal computer 12 processes the audio and video information received or generated by convergence functionality module 14, and outputs the corresponding information on display monitor 16. At least two viewing surfaces are possible when computer convergence system 10 is being operated in television mode, a primary viewing surface and a secondary viewing surface. The displayed image of the primary viewing surface fills the entire viewing screen, with only a portion of the screen dedicated to the viewing of the secondary viewing surface, such as a picture-in-picture (PIP).

When computer convergence system 10 is being operated in computer mode, computer 12 is utilized to perform computer functions, including executing and running software and interfacing with network 20, with the output of computer 12 being displayed on display monitor 16.

Figure 2:
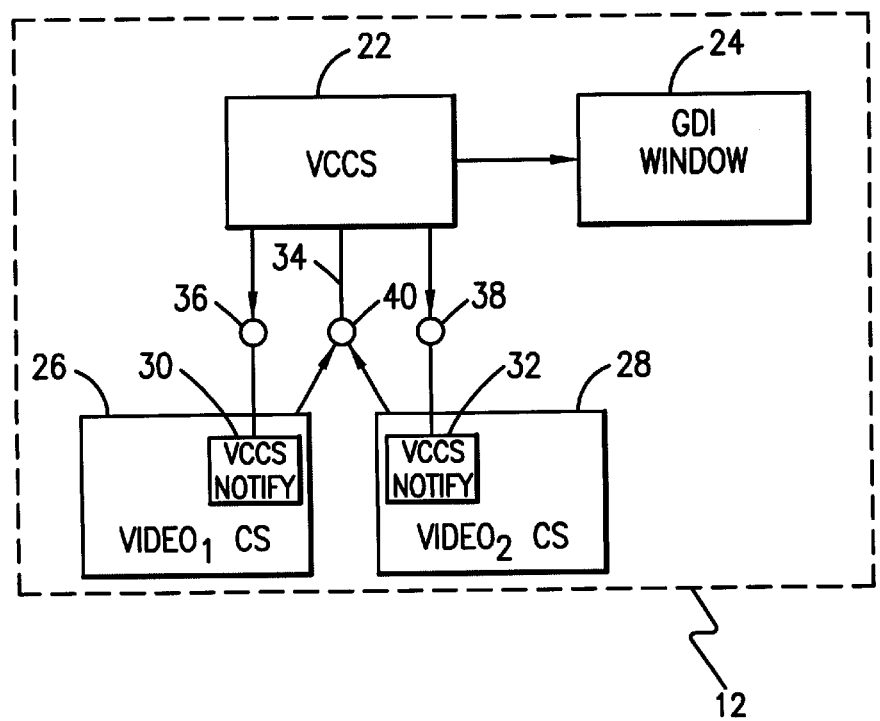
FIG. 2 is a block diagram illustrating the video center control service in accordance with the principles of the present invention.

Referring now to FIG. 2, there is shown a more detailed block diagram of some of the components utilized by computer 12. As depicted, the video control services of computer 12 includes a video center control service (VCCS) 22, a graphics display interface window 24, a first video control system (video1 CS) 26, a second video control system (video2 CS) 28, sinks 36, 38, and interface 40.

VCCS 22 is a central service that provides control for video applications received from convergence functionality module 14. All messages and commands that query or manipulate video applications are processed and/or routed by VCCS 22. The functionality of VCCS 22 includes: creating and owning the video display windows; processing all video control functions; handling bookkeeping of video control settings; managing the switching of the current video source; managing the external sources; initializing and configuring new external devices; and arbitrating application use.

Each of the video control systems 26 and 28 control the functions of the particular video source and further interact with any associated drivers. For example, if video control system 28 were the control system for a DVD component, the video control system would control the playback of the disk. It would also interact with the various drivers associated with the playback of the disk, such as the drivers that control the start/stop, find a particular place in the title of the disk, or pass along settings selected by the users.

As described herein above, one the problems encountered with a system utilizing multiple processes is that each process, i.e., video source controller, requires user interaction through its own user interface, whereby each of the user interfaces usually vary from process to process.

Therefore, as depicted in FIG. 2, the present invention provides a universal user interface, the graphics display interface window 24, which is controlled by VCCS 22 and displayed on display monitor 16. Graphics display interface window 24 provides user interaction for each of the multiple processes that can be controlled from a single point. This permits the processes to be free of the added complexity of creating and managing user interface components.

Graphics display interface window 24 is a graphics user interface which provides both information about the current video source and the state thereof, and provides a user with the ability to change the state of the source as well as the source itself through mouse, remote control, and keyboard interaction.

In operation VCCS 22 and video control systems 26 and 28 operate in a circular client/server relationship. That is VCCS 22 communicates to control systems 26 through sink 36, and VCCS 22 communicates to control system 28 through sink 38, whereby VCCS is acting as the server and control systems 26 and 28 are acting as the clients. Control systems 26 and 28 communicate to VCCS 22 through interface 40, whereby controls systems 26 and 28 are acting as servers and VCCS 22 is the client.

VCCS 22 is responsible for monitoring the system state and providing notification of state changes through sink notifications 30 and 32. This determines when a particular video source is active or inactive. VCCS 22 will make calls to corresponding control systems 26 and 28 to notify them when events affect the state thereof These events include the corresponding video source becoming the current source on the primary or PIP surfaces, changes in channel control, and changes in the video window dimensions.

When control systems are clients, they register through interface 40 and control path 34 to VCCS 22 to handle specific messages for each surface and source. For example if video1 is a DVD, control system 26 would register to handle specific messages when ever video1 is the current source on the primary video surface. When the system state matches the state for which a client has registered, and a message for which it registered is received by VCCS from DGI window 24, that message is forwarded to the appropriate client via VCCS notification sink (30 or 32) which the clients are required to implement. These messages would include messages generated by the user interface elements.

As can be appreciated, the present invention provides a computer convergence device, operable in a at least two modes, such as a computer mode and a video mode, and when operating in the video mode the computer convergence device is operable between at least two states. The computer convergence device includes a universal graphic user interface for providing information corresponding to the operating states. The universal graphic user interface receives inputs from a user which can be used to control various characteristics of each operating state, and can be used to change the operating state of the computer convergence device. The computer convergence device further includes a controller for interfacing between the universal graphic user interface and the processes of the operating states.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system operable in a computer functionality mode and a non-computer functionality mode, the non-computer functionality mode having a plurality of operating states, said computer system comprising:

a user interface for simultaneously providing selected information about at least two of the plurality of operating states, said user interface further for changing the operating state in response to a user input;

a first process, said first process operable during a first of the plurality of operating states; and a controller coupled between said user interface and said first process, said controller for managing data communication between said user interface and said first process, said controller and said first process for communicating instructions in a circular client/server relationship.

2. The computer system as recited in claim 1, and further comprising a second process, said second process operable during a second of the plurality of operating states; and said controller further coupled between said user interface and said second process, said controller further for managing data communication between said user interface and said second process.

3. The computer system as recited in claim 1, wherein said user interface includes a graphic user interface.

4. The computer system as recited in claim 1, wherein said first process includes a video source, said video source having a user interface.

5. The computer system as recited in claim 4, wherein said controller is further for managing data communications between said user interface of the computer system and said user interface of said video source.

6. A system having a computer functionality mode and a non-computer functionality mode, the non-computer functionality mode including a plurality of operating states, said computer system comprising:

a user interface for simultaneously providing selected information about at least two of the plurality of operating states, said user interface further for changing the operating state in response to a user input;

at least two processes, with a first of said processes operable during a first of the plurality of operating states, and a second of said processes operable during a second of the plurality of operating states; and a controller coupled between said user interface and said at least two processes, said controller for managing data communication between said user interface and said at least two processes, said controller and said at least two processes configured to communicate in a circular client/server relationship.

7. The computer system as recited in claim 6, wherein said user interface includes a graphic user interface.

8. The computer system as recited in claim 7, wherein said first of said processes includes a video source, said video source having a user interface.

9. The computer system as recited in claim 8, wherein said controller further for managing data communications between said user interface of the computer system and said user interface of said video source.

10. A computer system comprising:

a computer operable in a computer functionality mode and a video display functionality mode, the video display functionality mode including a plurality of states;

a user interface for providing selected information corresponding to at least two of said plurality of operating states of said computer, said user interface further for changing said operating state in response to a user input;

at least two processes, with a first of said processes operable during a first of said plurality of operating states, and a second of said processes operable during a second of said plurality of operating states; and a controller coupled between said user interface and said at least two processes, said controller for managing data communication between said user interface and said at least two processes, said controller and said at least two processes configured to communicate in a circular client/server relationship.

11. The computer system as recited in claim 10, wherein said universal user interface includes a graphic user interface.

12. The computer system as recited in claim 11, wherein said first of said processes includes a video source, said video source having a user interface.

13. The computer system as recited in claim 12, wherein said controller further for managing data communications between said user interface of the computer system and said user interface of said video source.

* * * * *